United States Patent
Beruschi

(10) Patent No.: US 7,698,912 B2
(45) Date of Patent: Apr. 20, 2010

(54) PROCESS AND EQUIPMENT USED TO CUT AND MODEL SHEETS OF LEATHER OR OTHER MODELLABLE MATERIALS

(76) Inventor: Giordano Beruschi, Via Filippo Corridoni, 37, I-62010 Montecosaro (MC) (IT)

( * ) Notice: Subject to any disclaimer, the term of this patent is extended or adjusted under 35 U.S.C. 154(b) by 414 days.

(21) Appl. No.: 11/791,236

(22) PCT Filed: Nov. 2, 2005

(86) PCT No.: PCT/IT2005/000627

§ 371 (c)(1),
(2), (4) Date: May 21, 2007

(87) PCT Pub. No.: WO2006/057019

PCT Pub. Date: Jun. 1, 2006

(65) Prior Publication Data

US 2008/0092603 A1    Apr. 24, 2008

(30) Foreign Application Priority Data

Nov. 23, 2004    (IT) .................. MC2004A0138

(51) Int. Cl.
*C14B 1/30*    (2006.01)
(52) U.S. Cl. .................. 69/8; 69/9; 69/21.5; 69/48
(58) Field of Classification Search .................. 69/8, 69/9, 21.5, 48
See application file for complete search history.

(56) References Cited

U.S. PATENT DOCUMENTS

| | | | | |
|---|---|---|---|---|
| 2,326,656 A | * | 8/1943 | Johnson | 12/1 R |
| 3,655,940 A | * | 4/1972 | Robinson | 219/243 |
| 4,544,429 A | * | 10/1985 | Sanchez | 156/227 |
| 5,480,605 A | * | 1/1996 | Skaalen et al. | 264/234 |

* cited by examiner

*Primary Examiner*—Shaun R Hurley

(57) ABSTRACT

A process used to cut and model sheets of leather or other modellable materials, according to which cutting and modeling are carried out by means of a die and a lid-punch that cooperate to cut a leather sheet positioned and tightened between the die and the lid-punch according to predefined cutting lines and at the same time model the sheet in a stable way by a plastic film injected on one of the two sides of the sheet.

3 Claims, 2 Drawing Sheets

PROCESS AND EQUIPMENT USED TO CUT AND MODEL SHEETS OF LEATHER OR OTHER MODELLABLE MATERIALS

BACKGROUND OF THE INVENTION

1. Field of the Invention

The present patent application refers to a special equipment used to cut and model sheets of leather or other modellable materials, in order to produce semi-finished products with desired profile and shape, designed to be incorporated in a more complex product obtained from moulding.

2. Description of Related Art

In particular, the process and equipment of the invention have been devised to solve a problem that is frequently encountered in the footwear sector, which refers to the fabrication of moulded outer soles and bottoms with built-in decorative inserts or constructive components made of natural or synthetic leather or other modellable materials.

According to the technique that is currently used to produce the said bottoms, leather inserts are cut out from a leather sheet, using special socket punches/cutters that cut a flat piece with predefined dimensions and profile and punch holes or slots in the piece, as well as seams or decorative cuts on the piece surface.

These semi-finished products are then loaded in the mould used to obtain the bottom, in such a way that the insert can be applied and fixed to the bottom during moulding, applying adhesive substances on the insert surface to guarantee strong uniform adherence between moulding material and insert.

This technique, which has been used for a long time, is advantageous in case of inserts with flat profile loaded in the mould in horizontal position, such as against the bottom wall of the mould impression.

However, problems arise when inserts are given a three-dimensional shape before being loaded in the mould, such as for example a cup shape with profile perfectly matching the profile of the walls where inserts are to be positioned.

In this case, after punching, the flat leather piece is modelled by special moulds.

In spite of the techniques used during modeling to guarantee stability of shape, no rapid, inexpensive and safe process has been devised so far to prevent the flat punched piece from springing out of shape.

BRIEF SUMMARY OF THE INVENTION

The purpose of the present invention is to provide a process used to cut and model a flat sheet of leather or other materials that can be cut and modelled like leather in a stable way, during the same productive cycle.

Another purpose of the invention is to provide an equipment used to implement the said process, which is composed of a single tool used to cut and model the flat leather sheet in a stable way.

According to the process of the invention, the first punching operation is carried out by means of a socket punch that compresses the sheet against a die, which is suitably shaped to provide pre-modeling of the sheet, in cooperation with the said punch.

In order to give the pre-modelled sheet the desired accurate shape and prevent it from springing out of shape, according to the process of the invention a thin layer of plastic material, such as thermoplastic polyurethane, is injected in one of the two sides of the sheet, which compresses the sheet against the walls of the die or punch, based on the side of the sheet that has been injected.

In any case, the pre-modelled sheet is forced to perfectly adhere to the wall of the die or punch under the pressure of the injection material, thus exactly copying the surface profile.

Obviously, the side of the sheet that is injected is not the visible face on the bottom in which the modelled insert is to be applied.

Once it solidifies and cools down, the layer of plastic material forms a surface indeformable film that obstacles springback of the modelled leather sheet.

Now, the modelled insert is loaded in the bottom forming die (the moulding operation is carried out with conventional techniques that do not fall within the scope of the present invention), it being evident that the coating film is designed to be covered and hidden by the material used to mould the bottom.

With reference to the equipment used to implement the process of the invention, it basically consists in an ordinary injection mould, of the type used to mould plastic outer soles, in which the lid and die are used to cut the piece of leather that is positioned between them.

Another characteristic of this mould consists in that the internal profiles of lid and die are designed to cooperate to pre-model the leather sheet tightened between them, it being provided that the exact final modelling of the sheet is carried out at a later stage by injecting the plastic material.

Finally, it must be said that the mould die or lid are provided with one or more channels used to inject the plastic material that creates the thin indeformable coating film that acts as a stiffening surface crust on the leather sheet.

BRIEF DESCRIPTION OF THE DRAWINGS

For purposes of clarity, the description of the process and equipment of the invention continues with reference to the enclosed drawings, which are intended for purposes of illustration only and not in a limiting sense, whereby.

DETAILED DESCRIPTION OF THE INVENTION

Figure 1:
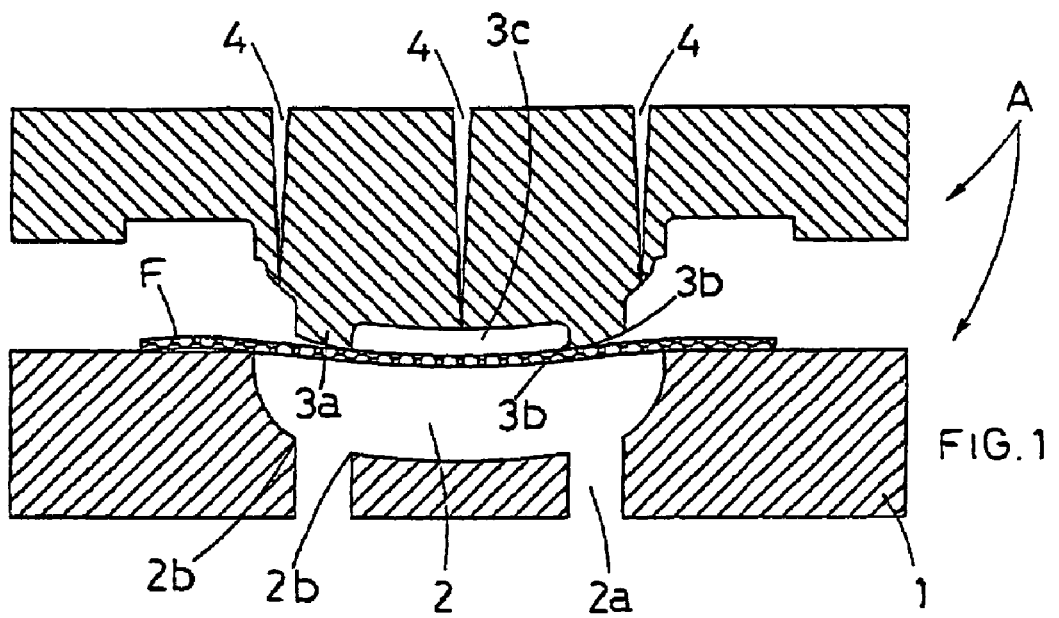
FIGS. 1 to 5 are transversal cross-sections of the equipment of the invention shown in different positions that correspond to different operations of the process of the invention.

With reference to FIGS. 1 to 5, the process of the invention is implemented by means of a special equipment (A) used to cut a flat leather sheet to measure and model it in a stable way during the same production cycle.

The said equipment (A) basically consists in an ordinary mould, of the type normally used to mould injection moulded bottoms made of plastic material, which comprises a die (1) with internal impression (2) that cooperates with a lid-punch (3) with protuberances (3a) on the internal side, provided with shaped cross-section and cutting corners (3b), that perfectly match with corresponding cavities (2a) located on the impression (2) and provided with cutting counter-corners (2b).

Figure 2:
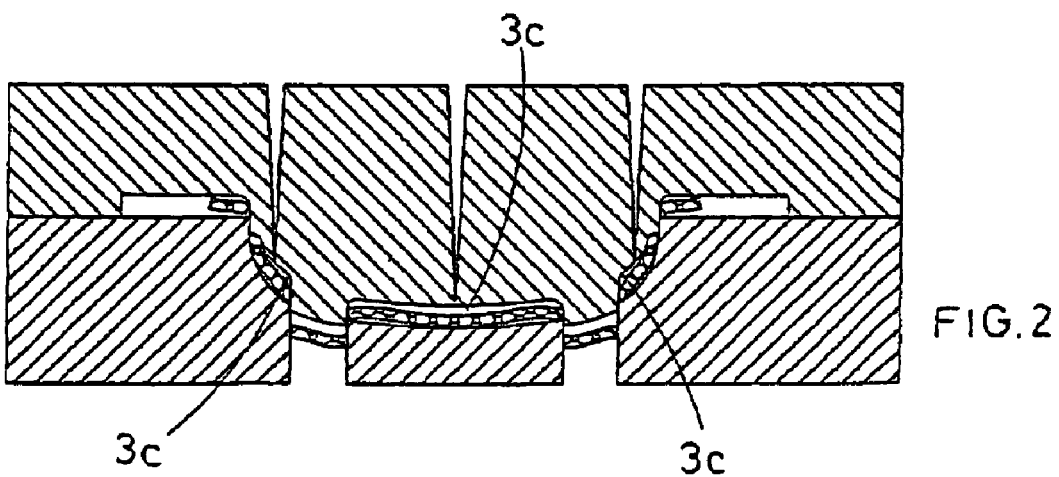
Figure 3:
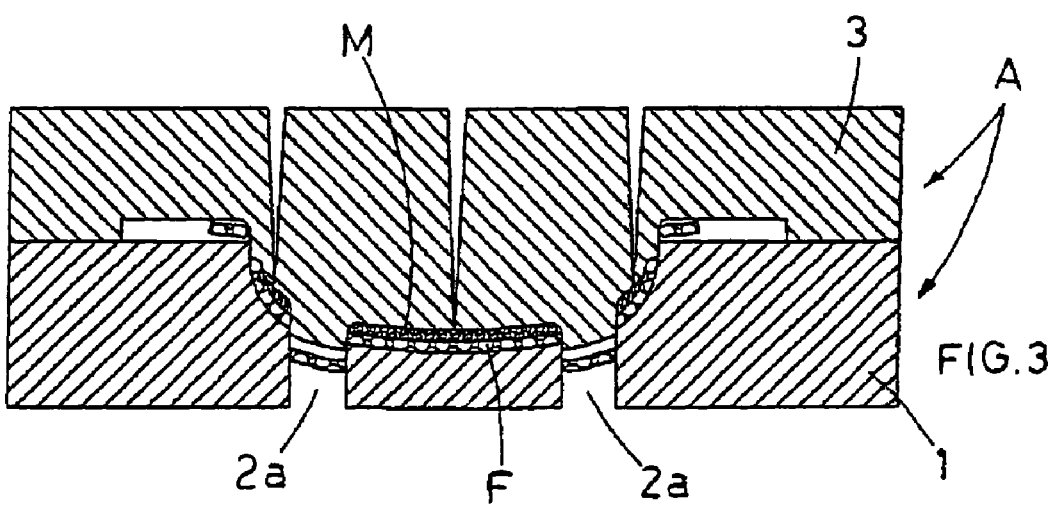
Figure 4:
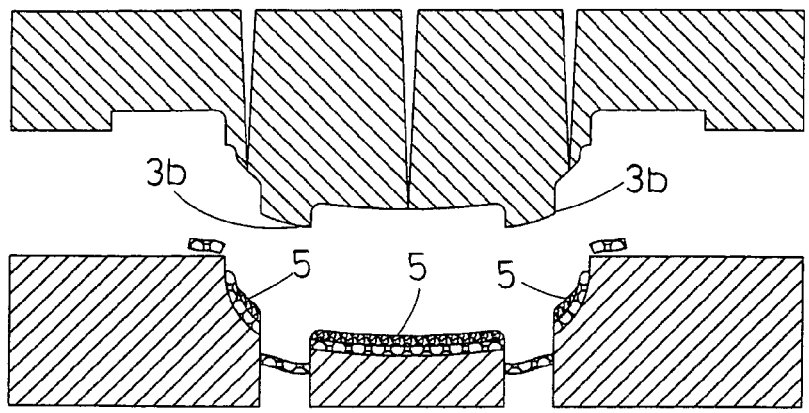

When the flat leather sheet (F) is positioned and tightened between the die (1) and lid-punch (3), as shown in FIG. 2, the edges of the impression (2) cooperate with the edges of the lid-punch (3) to cut the sheet (F) along a closed perimeter line (L), forming perimeter off-cuts (S).

The protuberances (3a) cut the sheet (F) with their cutting corners, thus forming leather off-cuts (S1) that are pushed to the bottom of the cavities (2a) by the protuberances (3a) during penetration in corresponding housings.

Because of the male-female coupling between lid-punch (3) and die (1), the sheet (F) positioned between the lid-punch (3) and die (1) is cut and modelled, being forced to assume the same profile as the internal sides of the lid-punch (3) and impression (2), between which the sheet (F) is tightened, as shown in FIG. 2.

The lid-punch (3) is provided with one or more channels (4) used to inject plastic material (M) inside the impression (2a).

According to the process of the invention, plastic material is injected until the sheet (F) is positioned inside the impression (2) and tightened under the lid-punch (3), whose protuberances (3a) are momentarily positioned on the bottom of corresponding cavities (2a), so that the injection material (M) is applied over the sheet (F), and not drawn inside the cavities (2a), thus filling the lowered open spaces (3c) provided on the internal side of the lid-punch (3).

Figure 5:
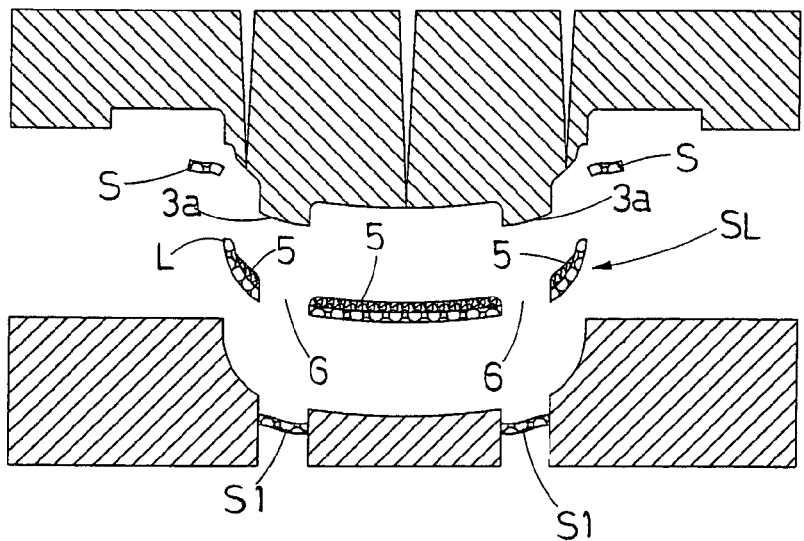

Under the pressure of the injection material (M), the sheet (F), after cutting and pre-modelling, is forced to perfectly adhere to the walls of the impression (2), exactly copying the surface profile; once it solidifies and cools down, the plastic material (M) forms a thin film (5) basically having the same surface area and shape as the sheet (F), as shown in FIG. 5 that illustrates the equipment (A) in open position with the semi-finished product (SL) extracted from the equipment.

The semi-finished product (SL) is obtained from the leather sheet (F) after cutting and modelling according to the shape of the impression (2) of the die (1), provided with holes (6) in the same positions as the protuberances (3a) of the lid-punch (3).

The sheet (F), after cutting and modelling, is coated by a thin coating film (5) moulded from plastic material on one side, i.e. the side facing the lid-punch (3), which basically acts as a stiffening surface crust on the leather sheet (F).

The process of the invention comprises the following operations:
positioning of a flat leather sheet (F) between the die (1) and the lid-punch (3)
closing of the lid-punch (3) until the protuberances (3a) completely penetrate the cavities (2a) located on the impression (2) of the die (1)
injection of plastic material (M) through injection channels (4) in order to finally model the sheet (F) and form a thin coating film (5) on one of the two sides of the sheet (F), as long as the sheet (F) is tightened between the die (1) and the lid-punch (3)
opening of lid-punch (3);
extraction of semi-finished product (SL) obtained from the sheet (F) after cutting and modelling, coated with the said thin film (5), of plastic material.

Figure 6:
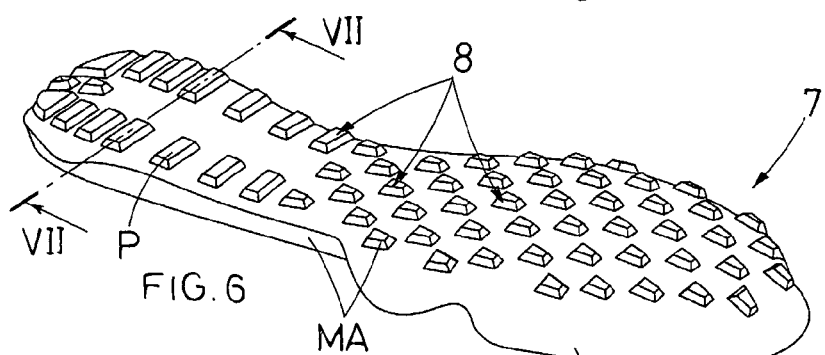
FIG. 6 is a perspective view of a bottom for shoes provided with a leather insert shaped and modelled with the process and equipment of the invention.
Figure 7:
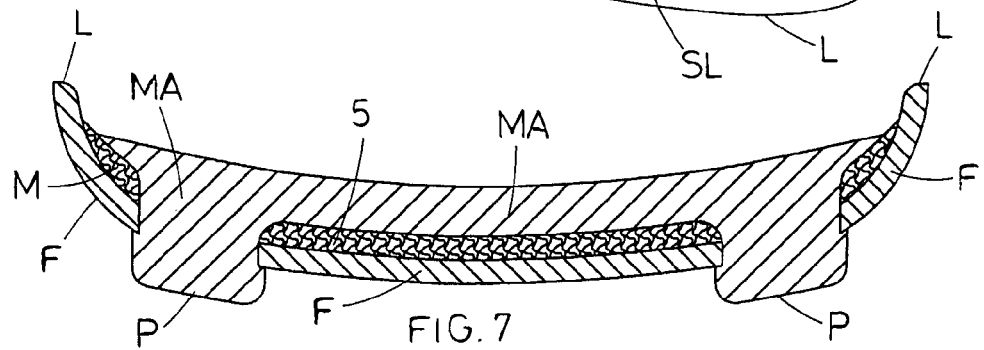
FIG. 7 is the cross-section of the bottom shown in FIG. 6 with transversal plane VII-VII.

FIG. 6 illustrates a bottom (7) for shoes obtained from injection moulding, which incorporates the semi-finished product (SL), in which the holes (6) are penetrated and filled with the injection material (MA) used to mould the bottom (7), whose tread (8) is formed by a series of protuberances (P) coming out of the leather sheet (F) after cutting and modelling.

The invention claimed is:

1. Equipment used to cut and model sheets of leather or other modellable material, wherein said equipment comprises a die (1) and a lid-punch (3) shaped in such a way that they cooperate to cut a leather sheet (F) positioned and tightened between the die (1) and the lid-punch (3) according to pre-defined cutting lines, and at the same time pre-model the leather sheet (F) according to a pre-defined shape;
the die (1) being provided with one or more injection channels (4) used to inject plastic material (M), said injection channels ending in lowered open spaces (3c) on an internal side of the lid-punch (3), said open spaces (3c) being designed to be covered by the same leather sheet (F) that is tightened and cut between the die (1) and the lid-punch (3).

2. Equipment as defined in claim 1, wherein the die (1) cooperates with said lid-punch (3), provided with protuberances (3a) with shaped cross-section and cutting corners (3b) on the internal side, designed to exactly match corresponding cavities (2a) on the impression (2) of the die (1) provided with cutting counter-corners (2b).

3. Process used to cut and model sheets of leather or other modellable materials, comprising the following operations:
positioning of a flat leather sheet (F) between a die (1) and a lid-punch (3);
closing of the lid-punch (3) above the die (1) to cut the sheet (F) according to pre-defined cutting lines and modelling the sheet (F) according to a pre-defined shape, by means of suitable modeling of the opposite internal walls of the die (1) and lid-punch (3);
injecting plastic material (M) through injection channels positioned on the die (1) or lid-punch (3) and ending in lowered open spaces that are momentarily covered by the sheet (F) tightened and cut between the die (1) and the lid-punch (3);
opening of lid-punch (3);
extracting the semi-finished product (SL) obtained from the sheet (F) after cutting and modeling, coated with a thin film (5) formed by the infection material (M).

* * * * *